Nov. 18, 1930.    M. A. POWERS    1,782,049
BURNER FOR PRODUCING HEAT FROM LIQUID FUEL
Filed Aug. 25, 1927    5 Sheets-Sheet 1
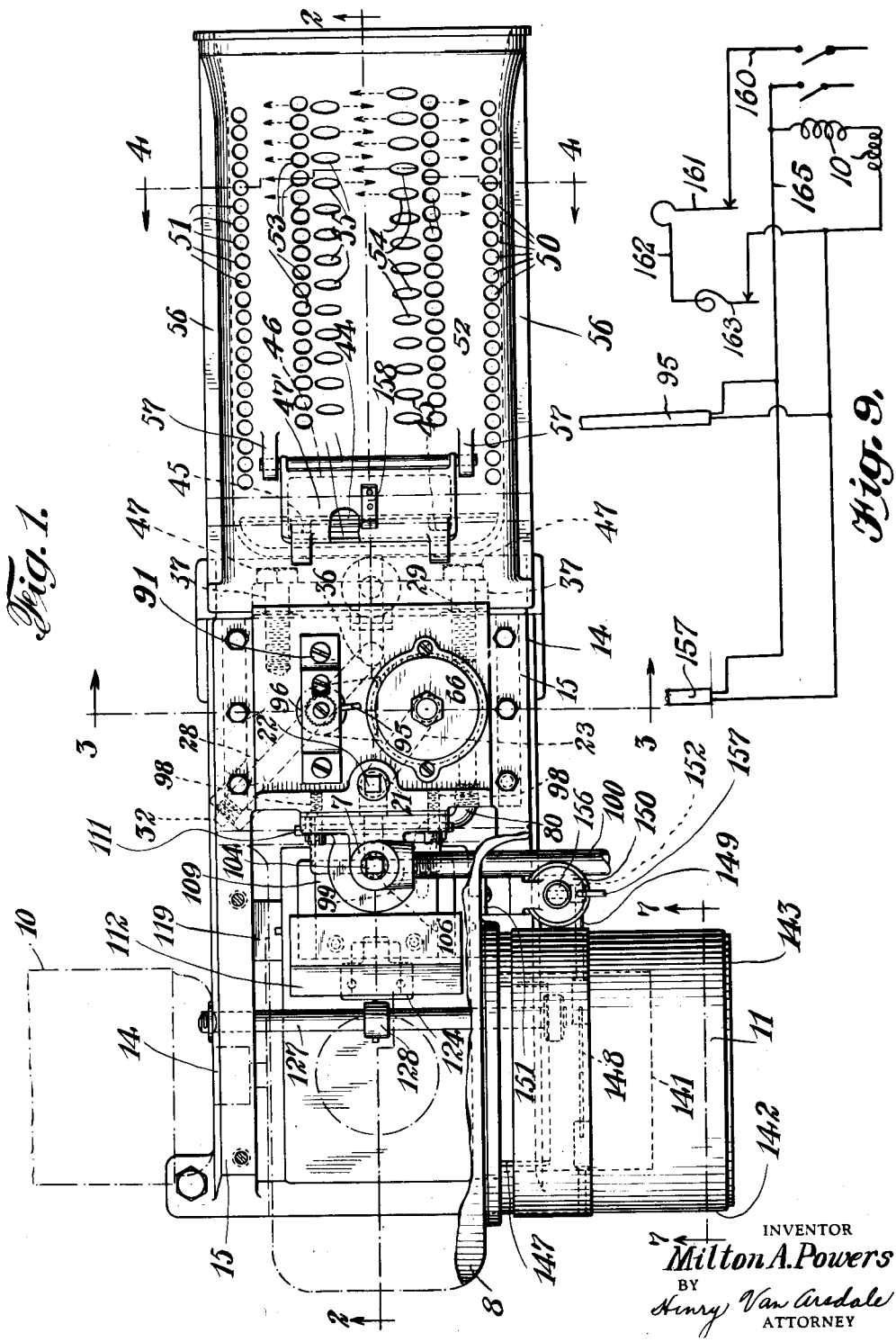
INVENTOR
Milton A. Powers
BY
Henry Van Arsdale
ATTORNEY

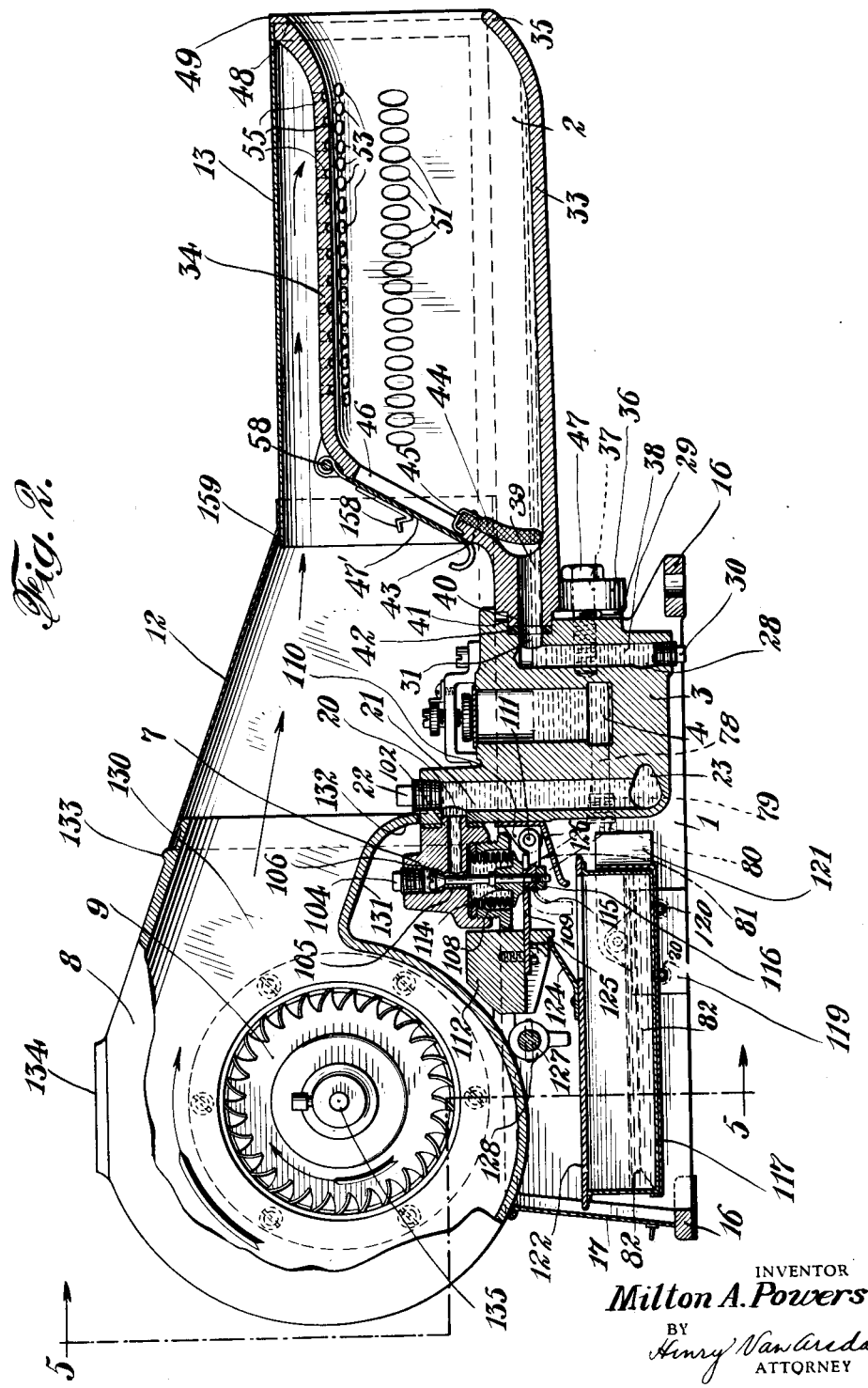

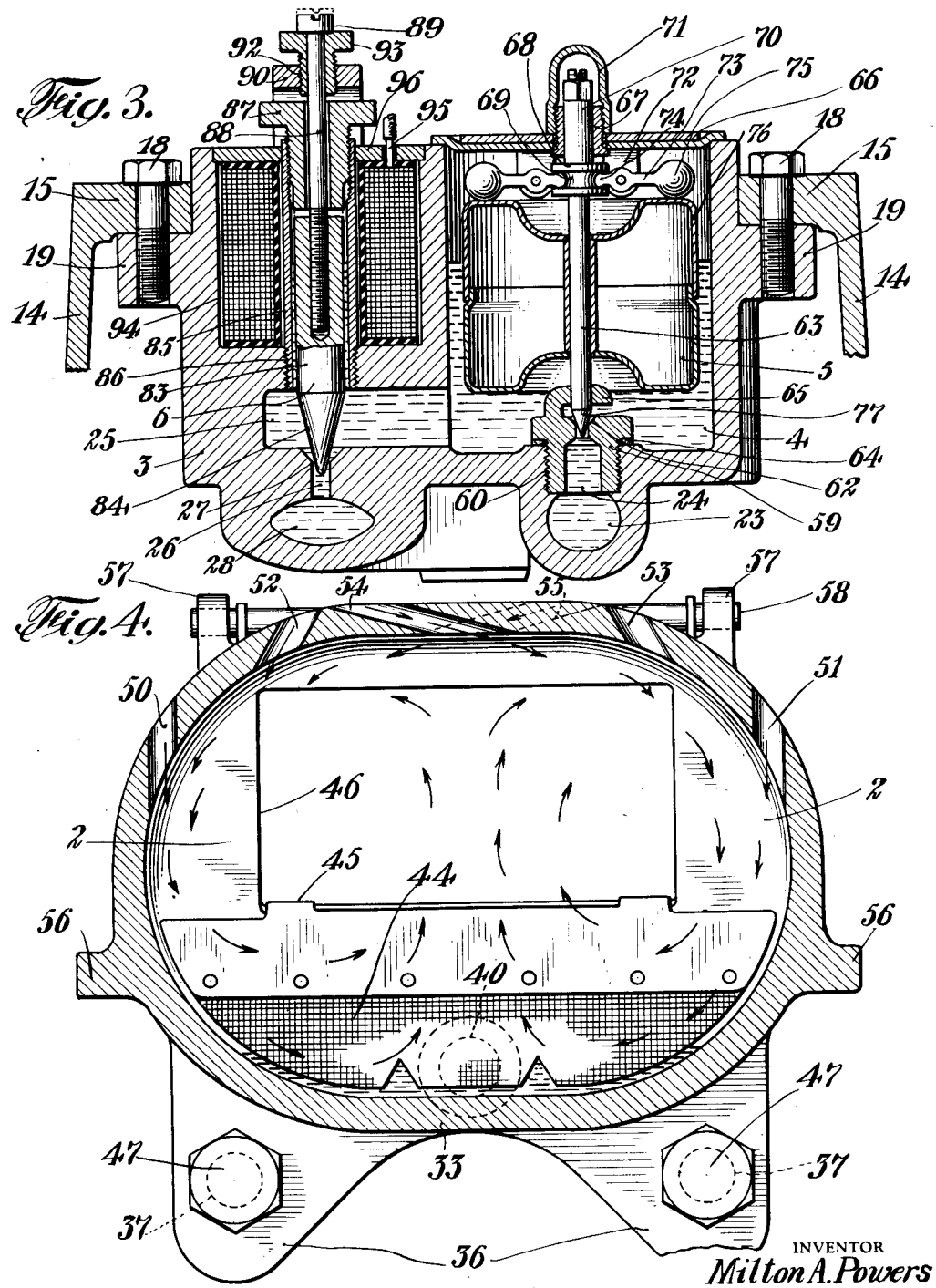

Nov. 18, 1930.  M. A. POWERS  1,782,049
BURNER FOR PRODUCING HEAT FROM LIQUID FUEL
Filed Aug. 25, 1927   5 Sheets-Sheet 4

INVENTOR
Milton A. Powers
BY
Henry Van Arsdale
ATTORNEY

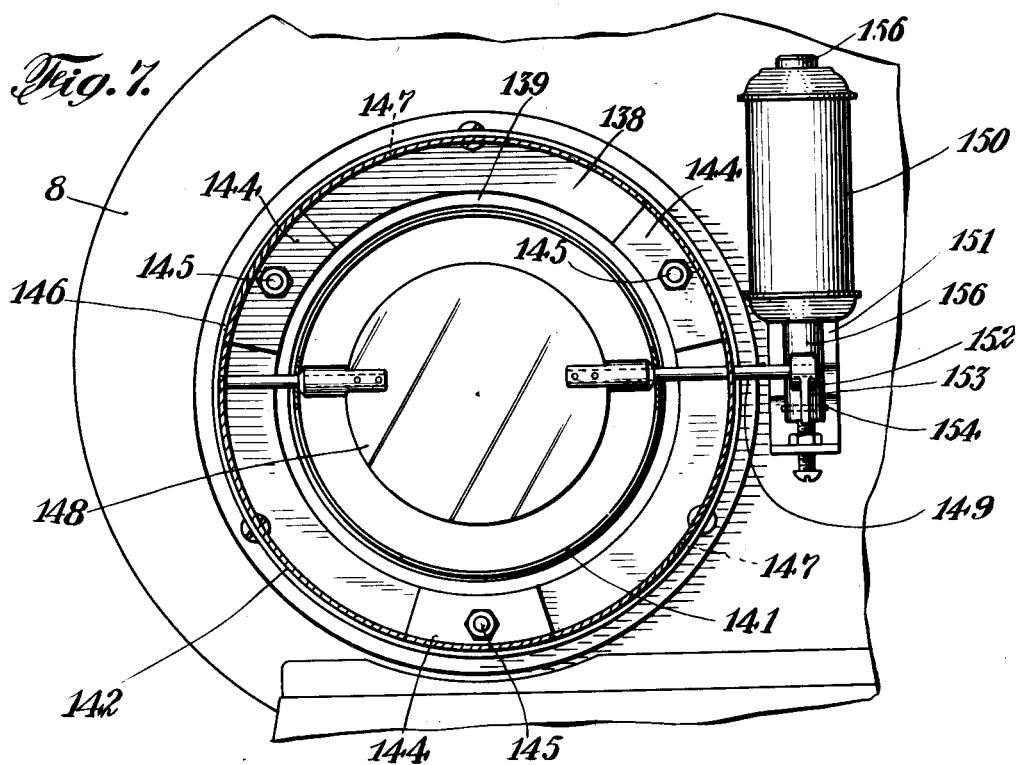
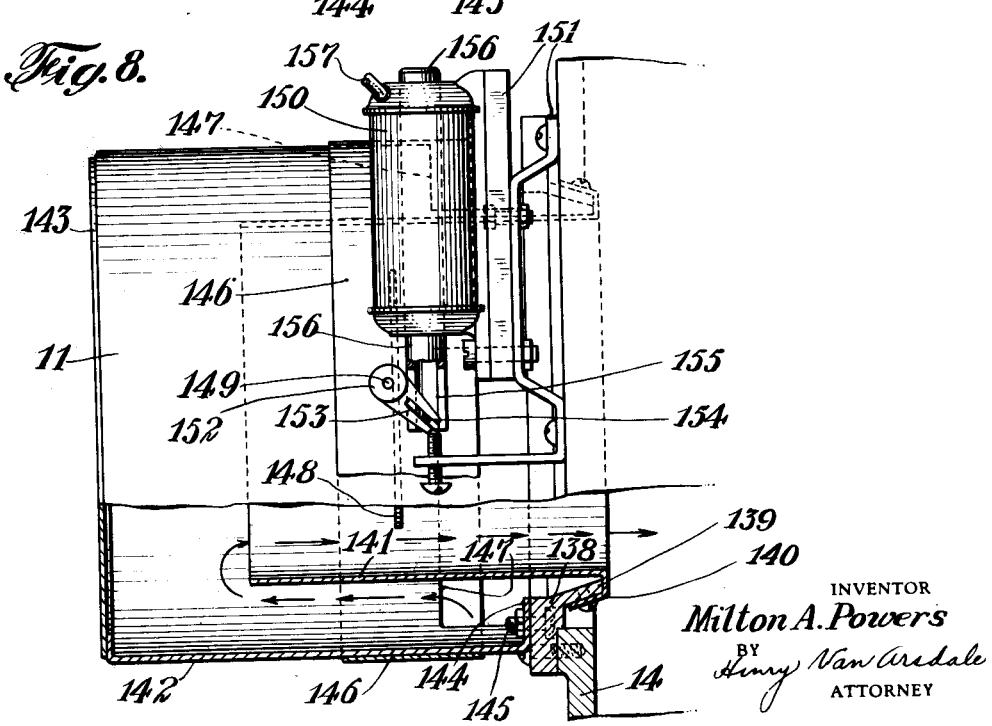

Patented Nov. 18, 1930

1,782,049

UNITED STATES PATENT OFFICE

MILTON A. POWERS, OF NEW YORK, N. Y., ASSIGNOR, BY MESNE ASSIGNMENTS, TO THE TIMKEN-DETROIT COMPANY, OF DETROIT, MICHIGAN, A CORPORATION OF MICHIGAN

BURNER FOR PRODUCING HEAT FROM LIQUID FUEL

Application filed August 25, 1927. Serial No. 215,494.

This invention relates generally to a method of burning liquid fuel and a burner by means of which the method is carried out. More specifically it relates to a burner for burning liquid fuel whereby an intimate combustible mixture of fuel and air is attained and burned in such a manner as to eliminate the possibility of cumulative carbon formation.

One of the difficulties heretofore experienced with liquid fuel burners is the excessive accumulation of carbon after the burner has been in operation for a short time. When carbon once forms in the burner there is a corresponding tendency for the carbon to build up and increase in volume unless steps are taken for removing or consuming it. Such carbon formations greatly lower the heating efficiency of the burner and if the gathering carbon is not removed, will eventually clog the burner, and prevent further operation. Another difficulty which has stood in the way of a more widespread adoption of automatically regulated liquid fuel burners is the fact that heretofore they have presented a complicated piece of mechanism, with many parts, and consequent ever present possibility of getting out of order. They have also been expensive in first cost and expensive to operate. Further, present units are generally cumbersome, large and unsightly.

An object of this invention is to provide a liquid fuel burner whereby the possibility of carbon being formed from the resulting combustion of air and fuel vapors is reduced to a minimum, and if any carbon should chance to form and begin to accumulate at one rate of fuel burning, it would be reduced when a different burning rate prevails. Another object of the invention is to produce a burner with a high heating efficiency and with the least number of parts thereby minimizing the possibility of the burner getting out of order. Still another object is to produce an automatically controlled liquid fuel burner which is sturdy, simple of operation, and easily controlled by the ordinary housewife. Another object is to produce a burner with all the automatic control features of liquid fuel burners now on the market at greatly reduced cost. Still another object is to produce a compact unit having no exposed parts, occupying a small amount of room space, neat in appearance and pleasing to the eye.

Other objects of this invention will be in part obvious and in part pointed out as the disclosure proceeds.

In accordance with this invention, copious streams of low pressure air are directed against a shallow pool of heated liquid fuel. Nozzles are provided for directing the streams of air, causing them to impinge and roll across the liquid surface until they are saturated with fuel vapors, then to rise upwardly to the top of the combustion chamber, curl over and again move downwardly, this time in contact with the incoming unsaturated air; this rolling and spiraling action of the air streams continuing as they advance forwardly and out of the combustion chamber. An ignited wick supplies the flame to ignite the combustible mixture of air and fuel vapor which becomes very thoroughly and intimately mixed before combustion is completed by this spiraling and rolling action. The ignited wick initially heats the combustion chamber to some extent, causing the liquid fuel thereby to also become heated and fuel vapors to be given off. As more air and fuel are supplied, the flame from the ignited wick extends itself to the liquid pool causing it to become further heated and more fuel vapor to be given off, increasing the rate of burning and the heat developed. Thus by controlling the rate of air flow and fuel flow to the combustion chamber, the rate of burning and heat developed thereby can be controlled at all times. The invention contemplates the automatic maintenance of a predetermined liquid fuel level in the combustion chamber and the automatic control of the maximum and minimum rate of fuel flow in correspondence with the maximum and minimum rate of air flow. The invention further contemplates the provision of adjusting devices for fixing this maximum and minimum relationship of air flow to fuel flow. The burner, in accordance with this invention, includes adjusting devices on the liquid fuel valve by which a minimum rate of flow of oil can always be maintained, to keep the ignited wick feebly burning, and an oil flow rate above a fixed maximum can be prevented. A magnetic device controls the rates of fuel flow from this maximum to minimum or vice versa. An electrical device operating the air valve is electrically connected in circuit with the magnet of the oil valve, so that an electric current passing through the circuit will operate the oil valve and air valve automatically and in unison.

The burner also embodies means for carrying out the various steps and burning operations referred to, and includes a combustion chamber for retaining the liquid fuel in a shallow pool, a wick for initially igniting the fuel and nozzles in the top of the chamber for directing the air against the fuel pool in such a manner as to cause it to spirally advance along the fuel pool resulting in an intimate mixture of fuel vapors and incoming air with consequent perfect combustion.

The invention further contemplates an improved safety device whereby an excessive accumulation of liquid fuel in the combustion chamber or other parts of the burner will cause a safety valve to be operated to shut off the fuel supply automatically. Certain adjustments will then have to be made before operation of the burner can be resumed.

The burner is, furthermore, of few parts and quickly assembled for operation. The covering portions are readily removable to permit free access to regulator and control parts.

In order that a clearer understanding of my invention may be had, attention is hereby directed to the accompanying drawings forming part of this application and illustrating certain possible embodiments of the invention.

Fig. 1 is a top view of the burner embodying this invention;

Fig. 2 is a vertical sectional view taken longitudinally of the burner on line 2—2 of Fig. 1;

Fig. 3 is a vertical cross sectional view of the reservoir block, showing the oil reservoir and oil flow control valves, and is taken on line 3—3 of Fig. 1;

Fig. 4 is a vertical cross sectional view of the combustion chamber with arrows showing the manner of the air flow, and is taken on line 4—4 of Fig. 1;

Fig. 7 is a side view of the air inlet to the blower housing and the automatic arrangement for operating the air inlet valve;

Fig. 8 is a side view of the same device showing more clearly the telescoping collar closure member for the air openings; and Fig. 9 is a diagrammatic view of one form of wiring arrangement for my burner.

Figure 5:
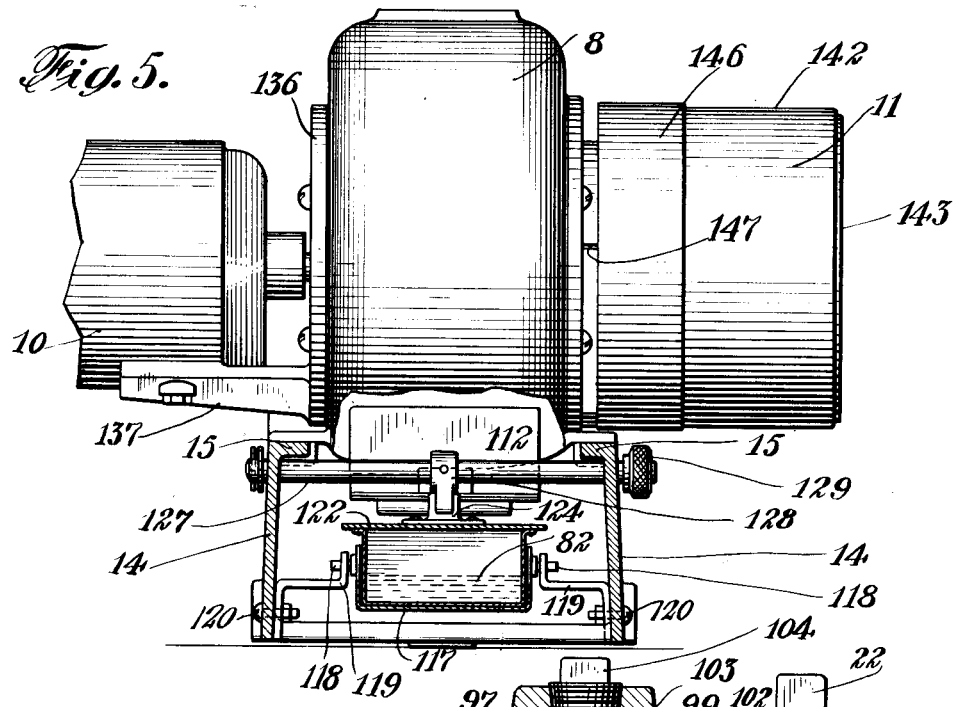
Fig. 5 is an end view of the burner with a portion thereof in section, and is taken on line 5—5 of Fig. 2.

Referring to the drawings, the burner generally comprises a base or supporting frame 1, a combustion chamber 2, a reservoir block 3 containing a liquid fuel reservoir 4, a float valve 5, and a liquid fuel control valve 6, a safety valve 7, a blower housing 8, a blower 9, a blower operating motor 10, an air valve 11, a hood member 12 and a cover member 13.

The base or supporting frame 1 is preferably made as an integral casting with side walls 14. Inturned flanges 15 extend along the upper edge of the side walls. The corners of the base are cast into foot formations 16 with apertures therein for bolting the base to the floor. A hinged door 17 pivoted to swing upwardly closes one end of the base member.

The reservoir block 3 is preferably made as a casting and is suspended at one end of the supporting frame by means of bolts 18 passing through the side flanges 15 of the base and integral flanges 19 extending laterally from the sides of the reservoir block. A hollowed out portion in the reservoir block forms the oil reservoir 4 and another hollowed out portion contains the fuel control valve 6 and its operating mechanism. The reservoir block has a liquid fuel intake passage 20 that extends from the inner end wall of the block horizontally into the block a short distance and there meets a vertical oil passage 21 extending from the top surface of the block. A clean out plug 22 closes the upper end of the vertical passage. The vertical oil passage extends a considerable distance into the block and then turns at an angle to form a horizontal oil passage 23 leading to and beneath the fluid reservoir and again turns to form a vertical oil passage 24, which enters and terminates at the bottom of the fluid reservoir. An enlarged oil passage 25 leads from the bottom of the oil reservoir and beneath the fuel control valve cavity and forms therebeneath a miniature oil reservoir. A contracted oil passage 26 leads from the bottom of the miniature reservoir and its mouth is formed into a valve seat 27. Contracted oil passage 26 opens into a larger horizontal passage 28 which extends from the outer side wall of the block toward the front end wall, where it meets a vertical oil passage 29 which extends through the bottom of the block and is closed by plug 30. Another horizontal oil passage 31 extends from the outer end wall of the block and enters the vertical oil passage 29. The outer end of the horizontal passage 28 is closed by a removable clean out plug 32. Thus, it is seen that the reservoir block contains a continuous passage for conducting fuel oil from the inner end wall, where the oil enters the block, to the fuel oil reservoir 4, to the fuel oil control valve 6 and out at the outer end wall. As above pointed out, vertical oil passage 21 opens at the top of the block, horizontal oil passage 28 opens at the side of the block, and vertical oil passage 29 opens at the bottom of the block, and by removal of clean out plugs 22, 32 and 30, respectively, closing their outer ends, a stream of air or liquid can be blown through the oil passage system to clean it of any clogging foreign matter.

The combustion chamber 2, made of heat-resisting metal, is cast into tubular form. It comprises a tray or belly portion 33 and a housing or back portion 34. An upturned lip 35 along the front edge of the tray portion retains the liquid fuel deposited therein. Attaching lugs 36 at the other end of the tray portion have bolt receiving apertures 37 and metal pad formations 38 at their tip ends. An oil passage 39 leads from the tray interior to the outer end wall and terminates in a projecting boss 40 which seats within a cavity portion 41 surrounding the external end of oil passage 31 in the reservoir block. The boss and cavity portions in the combustion chamber and reservoir block, respectively, keep the oil passages therein in correct alignment. A gasket member 42 may be inserted in the cavity portion, and when screw bolts 47, extending through the lug apertures and into the reservoir block, are tightened, the pad formations 38 contact with the front end wall of the reservoir block and cause the boss to seat firmly within the cavity and against the gasket member 42, resulting in a continuous oil conducting passage from the reservoir block to the combustion chamber. Gasket member 42 also serves as a heat insulating medium, preventing heat generated in the combustion chamber from passing to the reservoir block and unduly heating the same. The tray portion has an upturned flange formation 43 serving as an end wall for the tray. A wick 44 extends the breadth of the tray portion and has a clip member 45 attached thereto which curls over the upper edge of the upturned flange 43 and secures the wick in position.

The housing portion 34 of the combustion chamber has a small opening 46 through which a match or other igniting device may be inserted to light the wick. A door 47' hinged for upwardly swinging movement closes the opening. The front edge of the housing portion is formed into an upturned nose 48 and has a ridge or rib 49 around its outer periphery for a purpose which will be described hereafter. The housing portion is formed of metal of considerable thickness and has a series of holes in longitudinal rows along its top and sides, forming nozzle apertures. Preferably six rows of holes are used extending substantially the entire length of the top portion. The outside rows of holes 50 and 51, as shown in Figure 4, are sunk vertically into the back of the housing portion and in such a position as to be substantially in alignment with the interior surface of the side walls. These holes may be one-fourth of an inch in diameter and on three-eighths inch centers, but applicant does not limit himself to the particular size or spacing of the holes. A second pair of rows of holes 52 and 53, further up on the housing portion, extend longitudinally thereof and in staggered relation to the aforementioned rows of holes 50 and 51, and may be of the same diameter and spacing. The longitudinal axes of holes 52 and 53 are inclined outwardly to the vertical and toward the inner ends of holes 50 and 51. A third pair of rows of holes 54 and 55 are positioned longitudinally along the midline of the housing portion. These rows may be in staggered relation to each other and of different diameter and spacing than the rows of holes 50, 51, 52 or 53. The longitudinal axes of rows of holes 54 and 55 are more inclined than the axes of holes 52 and 53 and the inner ends of rows of holes 52 and 54, on the same side of the housing portion, diverge, as is well illustrated in Fig. 4. Thus, it is seen that the rows of holes are inclined at varying angles but always toward the side walls of the combustion chamber. The metal forming the housing portion is of such thickness that the holes therein in effect form nozzle apertures and are capable of directing a stream of air passing through them in a definite direction. Laterally extending side flanges 56 may be formed integrally along the sides of the combustion chamber for a purpose to be hereinafter disclosed. Lugs 57 may be formed on the combustion chamber to receive the pintle rod 58, to which door 47' is pivoted.

Float valve 5 in the fuel oil chamber, as illustrated in Fig. 3, fixes the maximum level to which the oil can rise on the tray portion of the combustion chamber. A valve seat member 59 having a threaded periphery 60 screws into the open end of the vertical oil passage 24 and has a vertical passage therein up through which the oil rises on its way to the oil reservoir. The top of the hollow portion converges into a constricted portion which is shaped to form a valve seat 62 for a needle valve 63. A suitable gasket 64 may be disposed between the valve seat member and the bottom of the oil reservoir to make a leak proof connection. A collar portion 65 formed integrally with the valve seat member surrounds the needle valve to guide it into seating position. A cover member 66 seats over the top of the oil reservoir and has a central threaded aperture into which a hollow plug member 67 screws. A collar member 68, having a circumferential groove 69 and an upwardly extending cylindrical portion 70, is secured to the upper end of the needle valve 63. The hollow plug member 67 surrounds the cylindrical portion 70 and serves as a guide for the upper end of the needle valve 63. A cap member 71 is threaded on to the plug member and forms a protective housing for the upper end of the needle valve. Cover member 66 has downwardly extending lugs 72 to which weighted levers 73 are fulcrumed. Each lever has a rounded end 74 which fits within the groove 69 and a weighted end 75 which rests upon the top of a bulb float 76 which rides on the surface of the oil pool in the oil reservoir. Now it will be seen that as the oil level in the reservoir rises, the bulb float also rises and lifts the weighted ends of the lever members. This lifting action on the weighted end of the levers causes the rounded ends thereof to descend carrying collar member 68 and the needle valve with them, the tapered end 77 of the needle valve thus approaching and eventually seating in the valve seat. Thus the oil inflow to the reservoir may be limited or entirely cut off. A corresponding lowering of the oil level in the oil reservoir lowers the float bulb, which permits the weighted ends 75 of the levers 73 to descend, lifting the tapered end 77 of the needle valve away from the valve seat. The oil reservoir is at such a level as to give a gravity flow from the reservoir to the tray portion of the combustion chamber. It is now seen that the oil level on the tray will tend to remain the same as that in the oil reservoir and the maximum oil level permitted on the tray will be the maximum oil level in the reservoir at which point valve seat 62 will be closed by the tapered end of valve 63. Thus the maximum oil level permitted on the tray may be regulated and controlled. An overflow oil passage 78, shown in Fig. 2, extends from the inner end wall of the reservoir block and enters the wall of the oil reservoir below the normal level of the oil therein. The outer end of the overflow passage is joined, by a suitable connection 79, to an overflow pipe 80 which has an upwardly curved portion 81 rising to a level above the maximum oil level permitted on the tray but below the level of the upper edge of lip 35 of the combustion chamber. Should the float valve become clogged or otherwise fail to operate and flooding of the tray above the maximum oil level begin, the oil would likewise rise in overflow pipe 80 and overflow into the trip pan 82, hereafter to be described. Thus it is seen that at no time will oil flood the combustion chamber to such an extent as to cause it to overflow.

The fuel flow control valve 6, as shown in Fig. 3, regulates the rate of oil flow to the combustion chamber and comprises an automatically operated valve stem 83 having a tapered end 84 adapted to seat within valve seat 27. A pipe 85 made of non-magnetic metal has a threaded end 86 which is screwed into the threaded wall of the vertical passage in the reservoir block and forms a guide for the vertical valve stem. The upper end of pipe 85 is interiorly threaded to receive hollow screw cap 87. An elongated bolt 88 having a head 89 is secured to the upper end of the valve stem and extends through screw cap 87. A bridge member 90 secured to the top of the reservoir block by suitable means, as screws 91, extends over screw cap 87 and has a threaded aperture 92 through which elongated bolt 88 projects. A second screw cap member 93 screws into the threaded aperture of the bridge member and supports the bolt head 89. Now it will be seen that the maximum and minimum seating relation of valve stem 83 with valve seat 27 can be varied by manipulating screw caps 87 and 93 respectively. A coil magnet 94 seats within the cavity formed in the reservoir block and surrounds the non-magnetic pipe 85. Lead wires 95 connect the magnet with a suitable power source in a manner hereafter to be described. Since pipe 85 is of non-magnetic metal the lines of force set up by the inflow of current to the magnet will not pass thru it but will pass around the end thereof and exert a lifting force on valve stem 83. Thus it is seen that when current flows to the magnet, the valve stem is lifted until it abuts the bottom of screw plug 87 opening the oil flow valve the predetermined maximum, and remains lifted until current to the magnet ceases to flow, when the valve stem drops back until bolt head 89 rests on screw cap 93, closing the fuel flow valve to the predetermined minimum. A cover member 96 closing the cavity has an aperture through which the lead wires 95 to the coil magnet extend.

Figure 6:
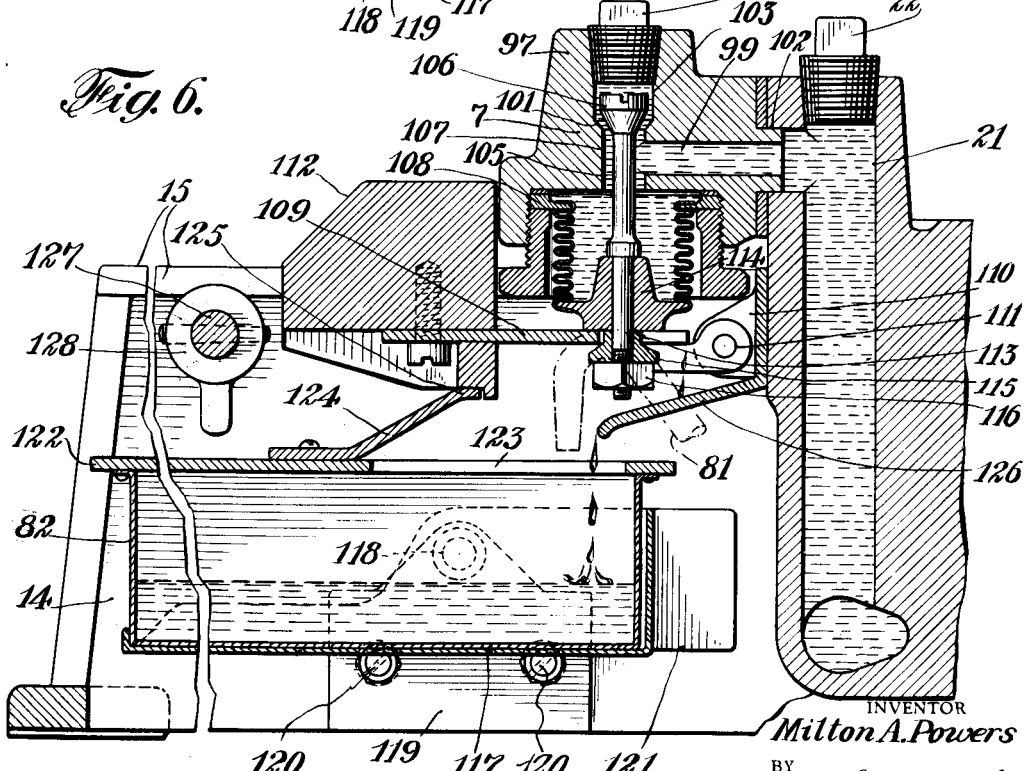
Fig. 6 is a vertical cross sectional view of the safety valve and drip pan shown in enlarged scale and is taken along the longitudinal mid-section of the burner.

Safety valve 7, as shown in Fig. 6, comprises a body portion 97 which contains the valve structure, and is secured by bolts 98 to the inner end wall of the reservoir block. The body portion contains an oil passage 99 leading from the oil supply pipe 100 to a valve seat 101, and out of the body portion where it terminates in an external boss 102 fitting into the open end of oil passage 21 in the reservoir block to form a tight joint and a continuous fluid passage from the oil supply pipe to the reservoir block. A clean out passage 103 extends from the valve seat vertically to the top of the body portion and is capped by a removable plug 104. Valve stem 105 has a headed portion 106 at one end which coacts with valve seat 101, extends through passage 107 and has a bellows arrangement 108 secured to its other end, which permits the valve stem to operate vertically against the flow of oil. An arm member 109, pivoted at one end to the reservoir block by means of lugs 110 and pintle 111, carries at its other end a pre-determined weight 112. The end of valve stem 105 extends through an aperture 113 in the arm member and is secured thereto between bellows collar 114, secured to the valve stem, and collared washer 115 held on the lower end of the valve stem by nut 116.

A cradle 117, illustrated in Figs. 5 and 6, is pivotally supported within the base member by pintles 118 projecting from the sides thereof and pivoted to lugs 119 secured to the side walls of the base by bolts 120. A weight 121 is secured to one end of the cradle to normally overbalance the same. Trip pan 82 is removably supported in the cradle and has a cover 122 with an opening 123 cut therein. A clip member 124 is secured to the trip pan cover and its tip end 125 is adapted to slide under and contact with weight 112. The point of contact of the clip and weight is between the vertical plane of the cradle pivot point and cradle weight 121, so that when the trip pan slides into position and clip member 124 raises the arm weight, any jars that the burner might receive will not cause the tip of the clip member to slide from beneath the weight. When the trip pan is in position, weight 121 overbalances the cradle and pan, causing the clip member to abut weight 112, holding the arm member 109 raised and the valve plunger 105 normally raised off the valve seat. As overflow oil accumulates in the trip pan to a certain point, the trip pan and cradle become overbalanced in the other direction, one end of the pan descends and with it the weighted arm member 109, causing valve plunger 105 to seat and the inflow of oil to be shut off. A shelf member 126 is secured to the end wall of the reservoir block and extends beneath the safety valve, to conduct any leakage from the safety valve into the trip pan. A manual weight lifting device is provided to facilitate and permit the insertion of the trip pan into the cradle once it has been removed, and comprises a rod 127 extending through the base member and having a lug 128 secured thereto adapted to engage the weight 112 and raise it as the rod is turned. A knurled knob 129 secured to a projecting end of the rod member facilitates the turning of the rod.

Blower housing 8 may be cast in one piece and secured to base flanges 15. A downwardly inclined tubular portion 130 directs the air towards the combustion chamber but preferably is cut short at the edge of the reservoir block. Floor part 131 of the tubular portion has a curled over edge 132 that comes to approximate contact with the upper edge of the reservoir block and forms, in conjunction with the vertical side walls of the blower housing, a protective enclosure for the safety valve 7. A circumferential ridge 133 may be disposed near the edge of the tubular portion for a purpose to be hereafter disclosed. The top of the blower housing may be given a rounded form or cast with a flattened top portion 134, as illustrated in Figs. 2 and 5, to improve its appearance and to provide a convenient place for attachment of the nameplate.

A suitable blower 9, designed to produce an overthrow stream of air of moderate velocity, is positioned within the blower housing and mounted on an extension of the armature shaft 135 of the motor 10. Shaft 135 is journaled in a side plate 136 secured to one side of the blower housing. A suitable bracket 137 extending laterally from the side plate 136 may be used to support the motor.

The air duct, illustrated in Figs. 7 and 8, is formed of a collar member 138 surrounding the air opening in the side wall of the blower housing, the collar member having an inturned flange portion 139, to which is secured the curled over flanges 140 of a sleeve member 141. A cup-shaped member 142, having a closed end 143 telescoping over but spaced from the side walls of sleeve member 141, has leg portions 144 formed integral therewith and secured by means of bolts 145 to collar member 138. A ring member 146 telescopes over the cup-shaped member 142 and is adapted to slide over the leg portions 144 thereof, closing or opening the openings 147 left between the legs, a variable amount as desired. Incoming air enters the openings 147, passes between the walls of the cup member 142 and sleeve member 141, into the sleeve member and into the blower housing, as illustrated by the arrows in Fig. 8. A closure member or damper 148 of a considerably less diameter than sleeve 142 is disposed therein and secured to the rod 149 journaled to the sleeve walls. When the damper is in vertical position, the sleeve is thus only partly closed. In this position of the damper, sufficient air is admitted into the blower housing and forced into the combustion chamber to support the low burning rate of combustion and still have sufficient air left over to burn deposited carbon heretofore described. The damper is preferably automatically operated by a solenoid 150 secured to the side wall of the blower housing by a suitable bracket 151. The damper may be operatively attached to the solenoid by means of a lug 152 secured to the rod 149, the lug having a slot 153 in which slides pin 154 secured to an extended portion 155 of the solenoid core 156. As the solenoid is energized by an electric current coming in through lead wires 157, the core is drawn up into the solenoid, lifts the end of lug 152 and opens the damper. When the solenoid is deenergized, the damper drops back to its normal closed position.

The lead wires from the electrically controlled oil flow valve and air valve are electrically connected to a power source and to a room thermostat. A diagrammatic sketch, for purpose of illustration only, of one form of wiring arrangement for the burner is shown in Fig. 9. Current passes from line wire 160 into the high voltage thermostat 161, through wire 162, to the boiler temperature control instrument 161, through wire 164, to the blown motor 10, and through the line wire 165, forming a complete electric circuit. The solenoid 94, operating the oil valve, has its terminal wires 95 joined to wires 164 and 165 of the thermostat and motor circuit and terminal wires 157 from solenoid 150 operating the air inlet damper member are similarly connected to the wires 164 and 165. The oil valve control solenoid 94 and the air damper control solenoid 150 are thus joined in parallel. As the thermostat calls for heat, the circuit closes, solenoid and coil magnet are energized and the oil flow control valve and the air flow control valve are opened to their maximum capacity. When sufficient heat has been produced, the thermostat breaks the circuit, and the oil valve and air valve drop back to partly closed position. The blower operating motor is preferably connected to a power source in a circuit distinct from the valve and thermostat circuit.

Cover member 13, of sheet metal, saddles the combustion chamber, curves around the same and is secured at its side edges to side flanges 56 of the chamber. The front edge of the cover member seats against ridge 49 on the nose portion of the chamber. Clip 158 attached to the chamber door 47' is adapted to engage the opposite edge 159 of the cover, holding the door in open position. Thus, it is seen that cover member 13 forms a closed air passage between it and the chamber housing, directing the current of air from the blower into the nozzle apertures.

Hood member 12, of sheet metal, overlaps the adjacent edges of the blower housing 8 and cover member 13, ridge 133 on the blower housing directing the positioning thereof. Its side edges are removably secured by suitable clip members to the burner base in such a manner as to permit easy removal of the hood for access to parts to be regulated or adjusted.

The operation of the burner is as follows:—Assuming that the burner has been properly connected to the oil supply tank, oil will flow through the safety valve, into the oil reservoir and rise to the maximum level permitted by the float valve. From the reservoir, the oil will flow to the oil flow control valve and on to the tray of the combustion chamber, where it will tend to assume the same level as the oil level in the reservoir. Wick 44 dipping into the oil pool formed on the tray is now ready for lighting. Trap door 47 is lifted, a lighted match inserted and the wick ignited. Sufficient air is usually present to permit the wick to continue to burn with a feeble flame without forced air. When the motor switch is turned on, the blower forces air into the combustion chamber through the nozzle apertures. If the damper air valve is in closed position, only a limited amount of air can enter the blower housing and be forced into the combustion chamber. This limited amount of air forced into the combustion chamber increases the rate of burning sufficiently to keep the tray and fuel pool heated to give off a limited amount of fuel vapor. This is called the low burning rate or point of minimum burning. This is the normal condition of the burner when put in operation and heat is not called for by the room thermostat. In this condition, the electric circuit joining a power source with the room thermostat, air valve and oil valve is open at the thermostat, and no current flows to operate the air valve or the oil valve. The oil flow control valve is, therefore, closed as nearly as adjusting cap 93 permits, allowing only the minimum rate of oil flow to the combustion chamber. Air valve 148 is then also in closed position, but it is made of such reduced size that such a quantity of air can still be drawn around the valve into the blower housing and forced into the combustion chamber as will give air in excess of that necessary to burn the limited amount of fuel oil admitted. This overabundance of air in the combustion chamber at the low burning rate supplies the air necessary to burn out any accumulated carbon or foreign matter that may be in the burner. As the temperature in the room drops, the thermostat operates to close the electrical circuit between the power source, oil valve and air valve, and causes the coil magnet 94 around the oil valve to become energized, opening the oil flow valve to maximum open position. The solenoid operating the air valve is likewise energized and the air valve opened to full open position. A condition of maximum oil flow and maximum air flow into the combustion chamber now prevails, and at these rates of air and oil flow, the oil valve port opening should be so adjusted in relation to the maximum air port opening as to give the proper mix of air and fuel vapors given off from the oil pool, to give the greatest calorific efficiency per pound of oil consumed. To adjust the burner so as to get the greatest calorific efficiency at the high burning rate, an examination is made of the flame, its color and intensity noted, and adjusting cap 87 is rotated to allow the oil flow valve to be opened a greater or lesser maximum amount as conditions require. When the proper maximum valve opening is found for the high burning rate, the maximum adjusting cap is fixed at that point and need not be further disturbed. The minimum rate of oil flow for the low burning rate can likewise be adjusted and fixed by adjusting cap 93, but should always be so adjusted that an overabundance of air in the combustion chamber will always be present to give sufficient air to burn out any carbon accumulated in the chamber during the period of high rate combustion, and yet not such an oversupply as to have a tendency to cool the chamber, which should always be maintained in heated condition by the low rate combustion and in readiness for high rate combustion when called for.

Should the tray chance to flood above the maximum fixed by the float valve, the oil will likewise flood the oil reservoir, causing the oil to back up into the overflow pipe 80 and drip into the trip pan. As the trip pan becomes filled, its outer end will eventually drop down, permitting the weighted arm 109 to drop and the safety valve to close, shutting off the oil supply to the burner. If the burner is in operation it will only burn until the fuel on the tray has been consumed. Before the burner can again be placed in condition for operation, the trip pan must be removed, the oil therein emptied, the pan reinserted in its cradle, and the trip manually reset, opening the safety valve permitting oil to supply the burner.

The burning process going on in the combustion chamber may be outlined briefly as follows. Due to the heated condition of the tray and the heat generated by the flame proceeding from the wick, the pool of oil in the bottom of the tray is constantly vaporizing. As a matter of fact, the possibility of any carbon collection is greatly minimized by maintaining the combustion chamber temperature at the points of contact with the incoming fuel sufficiently high to substantially immediately vaporize the oil. This action is better described by stating that the temperature of the metal in contact with the oil is high enough to prevent the oil wetting the metal surfaces except very close to its point of entrance to the chamber. The time elapsed between entrance of any particle of fuel and its complete vaporization is thus very small. It has been noted that under these conditions the release of carbon from the vapors during vaporization is practically eliminated as contrasted to the results obtained in the common method of comparatively slow distillation from a pool of liquid fuel.

The nozzle apertures in the top and sides of the housing portion of the combustion chamber direct the incoming streams of air down along each side of the housing portion, as is illustrated by arrows in Fig. 4. The air streams hit or impinge the fuel pool along each side edge and then begin to roll across the pool surface until the oppositely directed air streams meet at the center of the pool. By this partial roll and sweep across the pool they become well saturated with fuel vapors, and when they collide at the center of the chamber, they mix and rise together. The oppositely directed incoming air streams through nozzles 54 and 55 cause the rising column of vapor saturated air to divide and curl over in opposite directions, at the same time mixing with the incoming air. These vapor saturated air streams are also carried downwardly by the incoming air as it follows the walls of the chamber and partially rolled up therein. Fuel vapors in the center of the rolling stream of air are mixed with and absorbed by the air streams, as they roll, spiral, and advance out of the combustion chamber. When a suitable mixture of fuel vapor and air is attained, the mixture bursts into flame. As the burning progresses and the walls of the combustion chamber become sufficiently heated, a very small pool results, since the oil is almost immediately vaporized. The air, it is understood, continues to sweep the sides and bottom of the combustion chamber and mixes with the rapidly forming oil vapor. Thus, a continuous flame belches from the mouth of the combustion chamber, the flame having a rolling or whirling characteristic given it by the rolling and spiralling vapors in process of combustion. By this rolling and spiralling action, a most intimate mixture of air and fuel vapor results, with consequent perfect combustion of the oil and air.

No carbon is given an opportunity to form or collect at any place in the combustion chamber because the inside surfaces of the walls are completely bathed with the whirling air. The nozzle apertures are so disposed along the full length of the chamber as to eliminate any "dead" spots, or pockets where air is not in rapid motion. Downward and outward direction of the air sweeping the walls of the chamber is preferable because of the ease of application, because it causes concentration of rich vapors in the central portion of the combustion chamber away from the chamber walls where they would be inclined to collect in "dead" spots, and because the thickness of the air bath can be more easily controlled. The multiplicity of nozzle apertures permits the necessary volumes of air to be introduced at very low pressures and velocities, reducing the usual noise of combustion and tending to steady and improve the mixing of the air and oil vapors.

As many changes could be made in the above construction, and as many apparently widely different embodiments of this invention could be made without departing from the scope thereof, it is intended that all matter contained in the above description or shown in the accompanying drawings shall be interpreted as illustrative and not in a limiting sense.

What I claim is:

1. In a burner of the character described, in combination, a tray for liquid fuel, means for maintaining a pool of liquid fuel on said tray, means for sweeping a stream of air first downwardly to the edge of said fuel pool and then inwardly across said fuel pool, to entrain fuel vapor from the pool, and means for igniting the mixture of air and vapor.

2. In a burner of the character described, in combination, a tray for liquid fuel, means for maintaining a pool of liquid fuel on said tray, means for sweeping a stream of air first downwardly to the edge of said fuel pool and then inwardly across said fuel pool to create a combustible mixture of said air and vapor from said fuel pool, and means for igniting said combustible mixture.

3. In a burner of the character described, in combination, a tray for liquid fuel, means for maintaining a pool of liquid fuel on said tray, means for producing a stream of air, means for directing said stream of air first downwardly to the edge of said fuel pool on the tray and then inwardly toward the midsection of the tray to create a combustible mixture of said air and vapors from said fuel pool, and means for igniting said combustible mixture.

4. In a burner of the character described, in combination, a combustion chamber, said chamber comprising a tray portion and a housing portion, means for maintaining a pool of liquid fuel on said tray portion, means for producing a stream of air, said housing portion having openings therein so located as to direct said stream of air first down the sides of said housing portion and then against the surface of said pool.

5. In a burner of the character described, in combination, a combustion chamber, said chamber comprising a tray portion and a housing portion, means for maintaining a pool of liquid fuel on said tray portion, means for producing a stream of air, said housing portions having rows of nozzle apertures in staggered relation longitudinally disposed thereon, a cover member saddling said housing portion and directing said stream of air to said nozzle apertures, said nozzle apertures in turn directing said air against the surface of said pool.

6. A combustion chamber for liquid fuel burners comprising a tray portion and a housing portion, said tray portion having an upturned lip at one extremity and downwardly extending attaching lugs at its other extremity.

7. A combination chamber for liquid fuel burners comprising a tray portion and a housing portion, said housing portion having rows of nozzle apertures therein disposed in staggered relation approximately the full length thereof.

8. A combustion chamber for liquid fuel burners comprising a tray portion and a housing portion, said housing portion having longitudinal rows of nozzle apertures disposed along the sides and top walls approximately the full length thereof.

9. A combustion chamber for liquid fuel burners comprising a tray portion and a housing portion, said housing portion having longitudinal rows of nozzle apertures disposed along the sides and top walls thereof, the longitudinal axes of said nozzle apertures of the top longitudinal rows being oppositely inclined so as to direct streams of air entering said nozzle apertures downwardly along the inner side walls of said housing portion and across said tray portion.

10. A combustion chamber for a liquid fuel burner comprising a tray portion and a housing portion, said housing portion having longitudinal rows of nozzle apertures disposed along the sides and top walls thereof, the nozzle apertures in the respective rows being in staggered relation to each other, and the longitudinal axes of said nozzle apertures being so disposed as to direct streams of air downwardly along the inner contour of the side walls of said housing portion.

11. A combustion chamber for a liquid fuel burner comprising a tray portion and a housing portion, and a door hinged to the housing portion at one end thereof and adapted for upwardly swinging movement to permit ready access to the interior of the combustion chamber.

12. In a burner of the character described, in combination, a combustion chamber having a tray portion and a housing portion, the housing portion having an upturned nose at one end and an outwardly and upwardly swinging door at the other end, and a cover member saddling said housing portion and supported at one end by said upturned nose, said door having a clip member attached thereto for releasably engaging an edge of said cover member to hold said door in open position.

13. In a burner of the character described, in combination, a tray for liquid fuel, means for maintaining a pool of liquid fuel on said tray, means for directing a stream of air against said fuel pool transversely of the tray to create a combustible mixture of said air and vapors from said pool of fuel, means for igniting said combustible mixture and means for automatically increasing or decreasing the fuel supply and the air admitted.

14. In a burner of the character described, in combination, a tray for liquid fuel, means for maintaining a pool of liquid fuel on said tray at a predetermined maximum level, means for directing streams of air against said fuel pool transversely of the tray to create a combustible mixture of said air and vapors from said fuel pool, means for igniting said combustible mixture, and means for automatically increasing or decreasing the fuel supply and air admitted.

15. In a burner of the character described, in combination, a tray for liquid fuel, means for maintaining a pool of liquid fuel on said tray, means for directing a stream of air against said fuel pool to create a combustible mixture of said air and vapors from said fuel pool, means for igniting said combustible mixture, means for automatically increasing or decreasing the rate of fuel flow and the rate of air flow to the tray to a maxium or a minimum, and means for fixing said maximum and minimum rates of fuel flow.

16. In a burner of the character described, in combination, a tray for liquid fuel, means for maintaining a pool of liquid fuel on said tray at a predetermined maximum level, means for spirally advancing a stream of air along the surface of said fuel pool to create a combustible mixture of said air and vapors from said fuel pool, means for igniting said combustible mixture, means for automatically increasing or decreasing the fuel flow and the air flow to the tray to a maximum or a minimum substantially simultaneously, and adjustable means for fixing said maximum and minimum rates of fuel flow.

17. In a burner of the character described, in combination, a tray for liquid fuel, float means for maintaining a pool of liquid fuel on said tray at a predetermined maximum level, means for spirally advancing a stream of air along the surface of said fuel pool to create a combustible mixture of said air and vapors from said fuel pool, means for igniting said combustible mixture, and means for controlling the rate of fuel flow to said tray including a valve, devices for adjustably fixing the maximum and minimum opening of said valve and magnetic means for controlling the opening and closing of said valve.

18. In a burner of the character described, in combination, a tray for liquid fuel, means for maintaining a pool of liquid fuel on said tray including a fuel reservoir, a float valve in said reservoir for limiting the fuel flow to said tray to a maximum predetermined level, means for controlling the rate of fuel flow to said tray including a valve seat, a stem member adapted to seat thereon, adjustable means for controlling the seating of said stem comprising two rotatable members, one of said rotatable members adjustable to fix the maximum seating of said stem in said valve seat and the other of said rotatable members adjustable to fix the minimum seating of said stem in said valve seat and magnetic means surrounding said stem for changing the seating relation of said valve stem and said valve seat between said maximum and minimum points, and conduits for conducting the liquid fuel from said fuel control means to the reservoir and to the tray.

19. In a burner of the character described, in combination, a tray for liquid fuel, means for maintaining a pool of liquid fuel on said tray including a fuel reservoir, a float valve in said reservoir for limiting the fuel flow to said tray to a maximum predetermined level, means including a conduit leading from said reservoir and functioning to prevent overflow of said tray should the float valve fail to operate, means for controlling the rate of fuel flow to said tray and conduits for conducting fuel from said fuel control means to said reservoir and to said tray.

20. In a burner of the character described, in combination, a tray for liquid fuel, a fuel supply pipe, a safety valve normally in open position, a fuel flow control valve, means for automatically operating the same, means by which the maximum and minimum rate of fluid flow may be adjustably fixed, a fuel reservoir, a float valve in said reservoir limiting the fuel flow to said tray to a maximum predetermined level, and conduits for conducting the liquid fuel from said fuel supply pipe, to the safety valve, to the fluid flow control valve, to the gravity reservoir and to the tray.

21. In a burner of the character described, in combination, a tray for liquid fuel, means for maintaining a pool of liquid fuel on said tray, and means for impinging a stream of air against the surface of said pool including a blower, a housing therefor, an air inlet for said housing, a damper member for said inlet and automatic means adapted to be controlled by a room temperature device for opening and closing said damper member a predetermined amount.

22. In a burner of the character described, in combination, a tray for liquid fuel, means for maintaining a pool of liquid fuel on said tray and means for impinging a stream of air against the surface of said pool including a blower, a housing for said blower and tray, an air inlet to said blower, a damper member for regulating the quantity of air passing through the inlet and automatic means adapted to be controlled by a room temperature device for opening and closing said damper member a predetermined amount.

23. In a burner of the character described, including, in combination, a base member, a fuel reservoir block suspended within and secured to said base member, a combustion chamber, said chamber having downwardly extending attaching lugs at one end thereof, a fuel passage in said block extending from the fuel reservoir to the external face thereof, a fuel passage in said combustion chamber terminating in an external boss, pads at the tip of said lugs and bolts extending through said lugs and into said reservoir block for securing said combustion chamber thereto, and holding said fuel passages in alignment.

24. In a burner of the character described including, in combination, a base member, a fuel reservoir block suspended within and secured to one end of the base member, regulating mechanism in said block, a blower housing secured to the other end of the base member, and a hood member extending over the reservoir block and detachably secured to the base member to permit free and ready access to the reservoir block and regulating mechanism.

25. In a burner of the character described including, in combination, a base member, a fuel reservoir block suspended within and secured to one end of the base member, regulating mechanism in said block, a blower housing secured to the other end of the base member, a combustion chamber secured to the reservoir block, a cover member saddling said combustion chamber, and a hood member overlapping the blower housing and the combustion chamber cover, extending over the reservoir block and detachably secured to the base member to permit ready access to the reservoir block and regulating mechanism.

26. In a burner of the character described including, in combination, a combustion chamber, said chamber having air apertures therein, a blower, and means forming an air conduit for conducting air from the blower to said chamber apertures including a blower housing, a sheet metal cover member saddling the combustion chamber but spaced from the chamber apertures, and a hood member extending between and overlapping the edges of said blower housing and cover member.

27. In a burner of the character described, in combination, a tray for liquid fuel, means for maintaining a pool of liquid fuel on said tray, means for impinging oppositely directed streams of air against the surface of said pool so as to meet at the center portion of said tray and spirally advancing the same to create a combustible mixture of said air and vapors from said fuel pool, and means for igniting said combustible mixture.

28. In a burner of the character described, in combination, a tray for liquid fuel, means for maintaining a pool of liquid fuel on said tray, means for directing a stream of air against said fuel pool to create a combustible mixture of said air and vapors from said pool of fuel, means for igniting said combustible mixture and means for independently increasing or decreasing the fuel admitted and the air admitted.

29. In a burner of the character described, in combination, a tray for liquid fuel, means for conducting liquid fuel to said tray, means for controlling the rate of fuel flow to said tray, means for impinging a stream of air into contact with the fuel flowing onto said tray to create a combustible mixture of said air and entrained vapor from said liquid fuel, means for igniting the mixture, and means for controlling the quantity of air admitted, said fuel control and air control means being operated automatically and so synchronized that when the fuel flow is at its maximum such a quantity of air is admitted to mix with said fuel vapor or will produce the greatest calorific efficiency from the combustion and when the fuel flow is at a minimum such a quantity of air is admitted to mix with said fuel vapor as will maintain said tray in heated condition and in readiness for maximum combustion.

This specification signed this 22nd day of August, 1927.

MILTON A. POWERS.